United States Patent

Bae et al.

Patent Number: 5,586,842
Date of Patent: Dec. 24, 1996

[54] FILE GRINDER

[76] Inventors: Tae H. Bae; Sang Y. Bae; Sang I. Bae, all of 6898 Old Annapolis Rd., Linthicum, Md. 21090

[21] Appl. No.: 237,209

[22] Filed: May 3, 1994

[51] Int. Cl.$^6$ .......................... B23D 71/00; B23D 21/04; B23D 71/08

[52] U.S. Cl. .................... 407/29.14; 407/29.15; 30/304; 30/344

[58] Field of Search ................. 29/78, 79, 76.1, 29/76.2, 76.3, 76.4, 77, 80; 451/524; 30/304, 305, 342, 344; 81/177.7, 177.8; 16/110 R, 245; 407/29.1, 29.11, 29.12, 29.13, 29.14, 29.15

[56] References Cited

U.S. PATENT DOCUMENTS

| | | | |
|---|---|---|---|
| 56,457 | 7/1866 | Shepherd et al. | 29/90.1 |
| 324,389 | 8/1885 | Judge | 29/79 |
| 372,594 | 11/1887 | Bradt | 29/79 |
| 457,551 | 9/1891 | Williams | 30/304 |
| 621,378 | 3/1899 | Shoemaker | 29/79 |
| 735,825 | 8/1903 | Rohret | 29/79 |
| 901,290 | 10/1908 | Gardner | 29/79 |
| 905,132 | 12/1908 | Bacon | 29/80 |
| 1,011,916 | 12/1911 | Carlson | 29/79 |
| 1,100,544 | 6/1914 | Densmore | 29/79 |
| 1,151,197 | 8/1915 | Lang | 29/80 |
| 1,842,848 | 1/1932 | Steffen | 29/90.1 |
| 1,970,227 | 8/1934 | Frisbie | 29/90.1 |
| 2,103,499 | 12/1937 | Seifried | 29/79 |
| 2,396,443 | 3/1946 | Singer | 30/304 |
| 2,445,753 | 7/1948 | Anheuser | 29/80 |
| 2,549,570 | 4/1951 | Bryan | 29/79 |
| 2,635,509 | 4/1953 | Cowie et al. | 29/90.1 |
| 2,738,568 | 3/1956 | Civitelli | 29/79 |
| 2,839,817 | 6/1958 | Huxtable et al. | 29/80 |
| 2,949,661 | 8/1960 | Credit | 29/79 |
| 2,986,800 | 6/1961 | Civitelli et al. | 29/79 |
| 3,592,732 | 7/1971 | Wand | 162/204 |
| 3,656,216 | 4/1972 | Coon et al. | 29/80 |
| 4,219,383 | 8/1980 | Valkama | 162/305 |
| 4,552,620 | 11/1985 | Adams | 162/358 |
| 5,080,759 | 1/1992 | Buzby | 162/158 |
| 5,178,729 | 1/1993 | Janda | 162/101 |
| 5,320,036 | 6/1994 | Krohn | 100/154 |
| 5,427,638 | 1/1995 | Goetz et al. | 156/153 |

FOREIGN PATENT DOCUMENTS 136629 12/1902 Germany .................... 29/79

*Primary Examiner*—Jack W. Lavinder
*Assistant Examiner*—Christopher W. Day

[57] ABSTRACT

The present invention provides an improved abrading and cutting composite structure containing a plurality of blades and openings, as a multipurpose tool in construction and automotive fields.

1 Claim, 1 Drawing Sheet

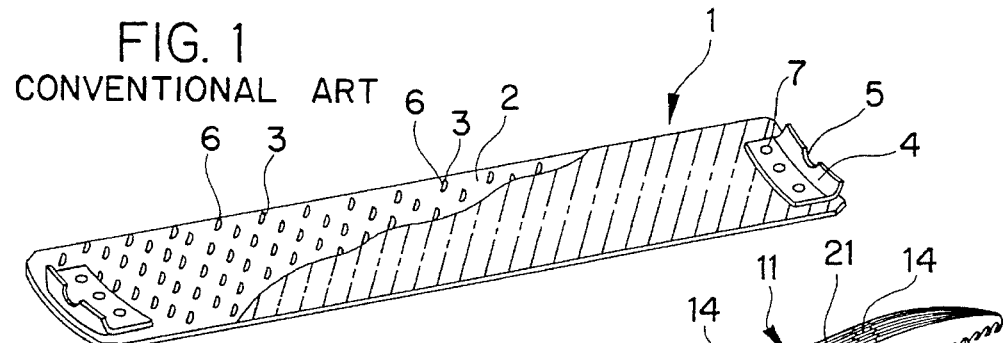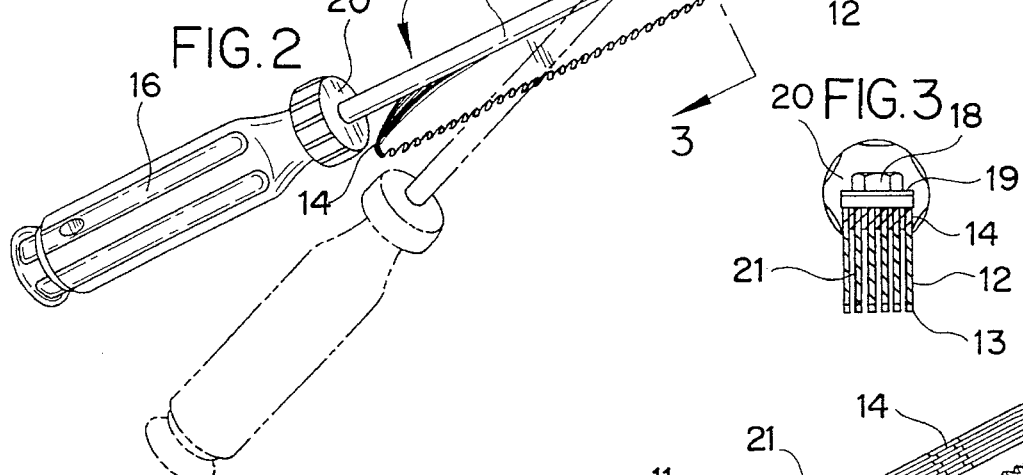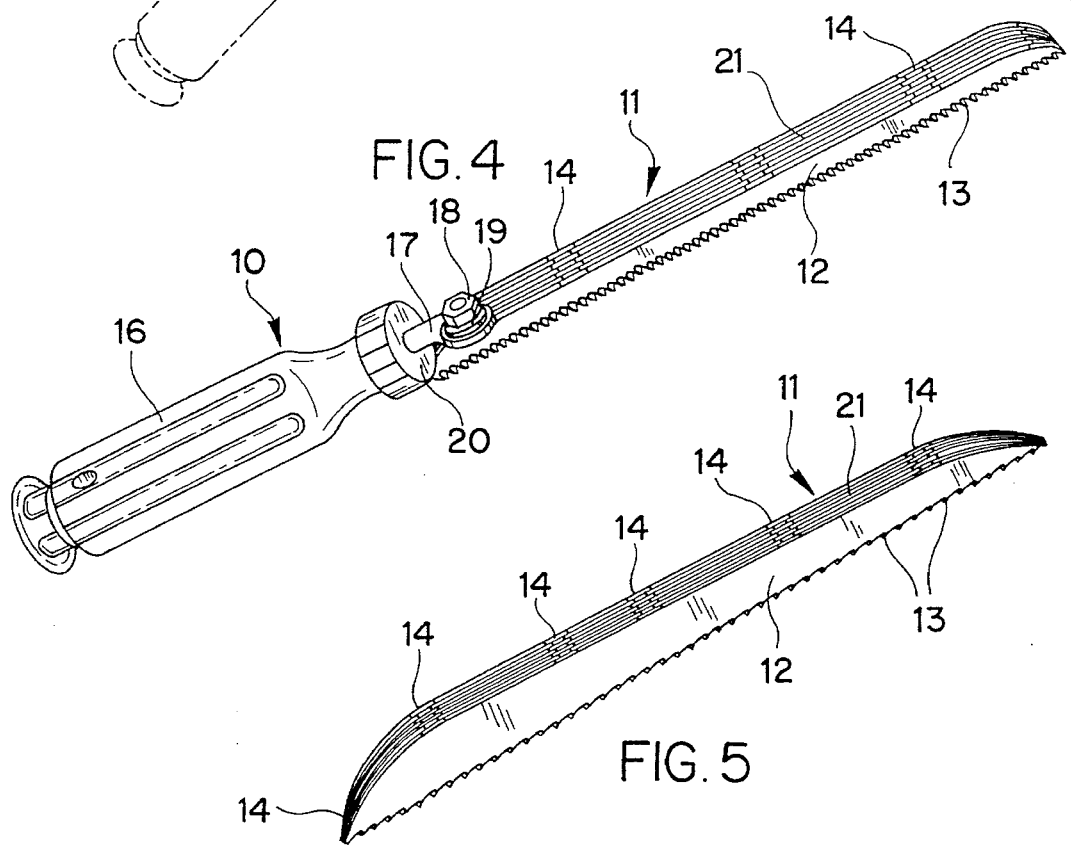

FILE GRINDER

BACKGROUND OF THE INVENTION

1. Field of the Invention

The present invention relates to an improved file grinder and more particularly, to an improved abrading and cutting tool assembly for use with a hand-operated drive assembly, such as a reciprocating sander, adapted for use in construction and automotive fields.

2. Description of the Related Art

In general, conventional file grinders 1 known in the art include a plurality of teeth 3 and openings 6 disposed on a tool body 2 and a pair of handle engagements 4 attached to the tool body 2 by bolts 7 and having an arc portion 5 disposed thereon as shown in FIG. 1. However, these file grinders suffer from a number of problems such as, for example, they are difficult to abrade and cut the object and remove a great amount of dust therefrom; they cannot operate in triangular or rectangular holes of an object; their teeth become too dull in a short time period; and the file grinders are difficult to clean.

SUMMARY OF THE INVENTION

Accordingly, it is an object of the present invention to provide a newly improved file grinder, which eliminates the above problems encountered with conventional file grinders.

Another object of the present invention is to provide a newly improved abrading and cutting tool assembly for use in construction and automotive fields.

A further object of the present invention is to provide a file grinder which includes a plurality of blades as a composite structure, a plurality of longitudinal openings for freely removing a great amount of dust therethrough, and a pivotal handle whereby this file grinder can abrade and cut effectively and operate in triangular or rectangular holes.

Still another object of the present invention is to provide a file grinder which is a composite structure containing a plurality of blades and having a handle attached to one end of the file grinder so as to effectively operate in a tubular object.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, the present invention provides an improved abrading and cutting composite structure containing a plurality of blades and openings, as a multipurpose tool in construction and automotive fields.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 1 is a perspective view of a conventional file grinder;

FIG. 2 is a perspective view of a first embodiment of a file grinder according to the present invention;

FIG. 3 is a cross-sectional view of FIG. 1, taken along line 3—3;

FIG. 4 is a perspective view of a second embodiment of a file grinder according to the present invention; and FIG. 5 is a perspective view of a third embodiment of a file grinder according to the present invention.

DESCRIPTION OF THE PREFERRED EMBODIMENTS

Referring now in detail to the drawings for the purpose of illustrating embodiments of the present invention, the file grinder, as shown in FIGS. 2 and 3, comprises a composite structure 11 containing a plurality of steel blades 12 and a plurality of steel spacer links 14 for forming a plurality of longitudinal cleaner channels or passages 21, so as to smoothly and effectively remove grinding dust of the object therethrough, and a handle 10. The blades are straight and elongated, as shown on FIGS. 2, 4 and 5. Each of the elongated blades has a substantially flat upper edge, an opposed lower edge, a predetermined thickness, and a median line defined by a line extending along the elongated blades at a position halfway between the upper edge and the lower edge. The passages 21 have a passage depth extending from the lower edge of the elongated blades to a depth beyond the median line, as shown in FIG. 3. The longitudinal passages 21 of the passage depth extend along substantially the entire length of the composite structure. The spacer links are entirely located between the upper edge and the median line, as shown in FIG. 3. The thickness of the spacer links is approximately equal to the thickness of the elongated blades, as shown in FIG. 3.

Each blade 12 is made of steel and includes a plurality of equally spaced toothed cutting edges 13 for abrading and cutting the object. The links 14 are fixed to the blades 12 by means of conventional methods such as welding.

The handle 10 defines a grasping portion 16, an end face 20, and a rod 17. The rod 17 has a distal end with an aperture therein pivotally connected to a top middle portion of the composite structure 11 by a threaded bolt 19 which is attached to the top of one of the links 14. A threaded nut 18 secures the rod 17 to the bolt 19. The handle 10 can be extended from the composite structure 11 at any angle (i.e. 360°) depending on the structure of the object to be abraded. For example, in order to abrade and cut a wide open space of the object, the handle 10 should extend from the composite structure 11 of the present invention at an angle of 90°. The threaded bolt, nut and aperture make up fastening means for fastening the rod to the composite structure.

The facing of the toothed cutting edges 13 provides a varied slope so as to effectively abrade and cut an object. Also the toothed cutting edges 13 are made of extremely hard material, such as sintered carbides, steels, etc. Also, the number of toothed cutting edges 13 in a certain length of the steel blades 12 can be determined based on the material of the object and grinding efficiency.

Referring in detail to FIG. 4, there is illustrated an additional embodiment of a file grinder in accordance with the present invention. The handle 10 is fixed to one end of the composite structure 11 by the bolt 19 attached to the top of composite structure 11, and the nut 18. The handle 10 is to be extended from the composite structure 11 so as to operate in all types of openings of an object.

Referring in detail to FIG. 5, there is illustrated a third embodiment of a file grinder in accordance with the present invention. The composite structure 11 without any handle 10 can be used by hand or attached to conventional apparatuses such as rollers, belts, etc. (not shown). One specific example is the attachment of the composite structure 11 to a rotator. Such an embodiment would include a flat rotating disk-like structure having at least one composite structure radially attached thereto, so that the composite structure provides a grinding surface for said rotator.

In manufacture, a plurality of steel blades 12 are aligned substantially parallel to one another as a bundle and several links 14 are mounted across the plurality of steel blades 12 by means of any conventional methods such as welding. As shown in FIGS. 2–5, and especially FIG. 3, this allows the blades to be secured together while allowing the outermost blades to define the maximum width of the composite structure. In other words, there is no need for fasteners to extend through the blades thereby increasing the overall width of the composite structure. Further, as shown in FIG. 2, the width as well as the height of the composite structure decreases at the opposed end portions of the composite structure. This is due to the decrease of the spacing which exists between each of the individual blades. As shown in FIG. 3, the spacing between each of the individual blades which form the longitudinal channels is approximately equal to the thickness of the individual blades. This spacing is continuous and uninterrupted along approximately the entire length of the composite structure. However, at the opposed end portions, this spacing is much less, as FIG. 2 illustrates. The decrease in spacing forms a tapered end portion at each opposed end portion of the composite structure, which, as FIG. 2 illustrates, tapers in both the width and height directions. The bolt 19 is fixed to the link 14 disposed on one end, as in FIG. 4, or the top portion of the bundle of the composite structure 11 of steel blades 12, as in FIG. 2. The handle 10 is pivotally attached to the bolt 19 by the nut 18. Thereafter, the handle 10 is adjusted according to specific jobs and the object shape and securely fixed to the composite structure 11. While the file grinder works on an object, the grinding dust can be smoothly separated therefrom through the longitudinal openings 21 so that the file grinder of the present invention can be effectively operated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. An abrasive tool comprising:
   a plurality of straight elongated blades, each of said elongated blades having a substantially flat upper edge, an opposed lower edge having a plurality of spaced-apart teeth located thereon, a predetermined thickness, and a median line defined by a line extending along said elongated blades at a position halfway between said upper edge and said lower edge;
   a plurality of spacer links interconnecting respective sides of said plurality of elongated blades together in spaced-apart relation, said spacer links being entirely located between said upper edge and said median line, a thickness of said spacer links being approximately equal to said predetermined thickness of said elongated blades, said elongated blades and said spacer links forming a composite structure having a predetermined length and opposed end portions, with outermost elongated blades of said composite structure defining a maximum overall width of said composite structure, said elongated blades being spaced-apart and substantially parallel to one another along substantially their entire length to form a longitudinal passage between each of said elongated blades, each said longitudinal passage having a passage depth extending from said lower edge of said elongated blades to a depth beyond said median line, each said longitudinal passage of said passage depth extending along substantially the entire length of said composite structure, each said longitudinal passage between said elongated blades decreasing in both width and height at each of said opposed end portions to form a tapered end portion of said composite structure, each longitudinal passage including a plurality of longitudinal openings adjacent said upper edges of said plurality of elongated blades for allowing grinding dust to pass therethrough;
   an elongated substantially cylindrical handle, said handle including an elongated rod located coaxially therein and extending longitudinally therefrom; and
   fastening means for fastening said rod to said composite structure, said fastening means including a threaded member extending from said upper edges of said elongated blades and located approximately centrally along the length of said composite structure, an aperture located at a distal end of said rod for loosely receiving said threaded member therein, and a nut threadably attached to said threaded member, said fastening means allowing said composite structure to pivot relative to said handle such that a longitudinal axis of said composite structure may assume any angular orientation within 360° with respect to a longitudinal axis of said handle.

\* \* \* \* \*